(12) United States Patent
Dietz

(10) Patent No.: US 6,664,744 B2
(45) Date of Patent: Dec. 16, 2003

(54) AUTOMATIC BACKLIGHT FOR HANDHELD DEVICES

(75) Inventor: Paul H. Dietz, Hopkinton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 10/115,299

(22) Filed: Apr. 3, 2002

(65) Prior Publication Data

US 2003/0189211 A1 Oct. 9, 2003

(51) Int. Cl.⁷ .............................. G09G 3/36; G05F 1/00
(52) U.S. Cl. ........................................ 315/291; 345/102
(58) Field of Search ................................. 315/292, 291, 315/294, 312, 316; 374/163, 142; 356/402; 345/102

(56) References Cited

U.S. PATENT DOCUMENTS

| 4,168,427 | A |   | 9/1979  | Hubbard .................... 359/152 |
| 4,567,480 | A | * | 1/1986  | Blanchard ................... 345/175 |
| 5,537,211 | A | * | 7/1996  | Dial .......................... 356/402 |
| 5,736,973 | A | * | 4/1998  | Godfrey et al. ............. 345/102 |
| 5,795,327 | A | * | 8/1998  | Wilson et al. ................ 604/65 |
| 5,829,878 | A | * | 11/1998 | Weiss et al. ................ 374/163 |
| 5,903,624 | A | * | 5/1999  | Boswell et al. .............. 379/21 |
| 6,204,752 | B1 | * | 3/2001 | Kishimoto .................. 340/432 |
| 6,219,021 | B1 | * | 4/2001 | Izumi ......................... 345/102 |
| 6,400,103 | B1 | * | 6/2002 | Adamson .................... 315/292 |
| 2001/0013854 | A1 | * | 8/2001 | Ogoro ...................... 345/102 |

* cited by examiner

Primary Examiner—Don Wong
Assistant Examiner—Chuc Tran
(74) Attorney, Agent, or Firm—Dirk Brinkman; Andrew Curtin

(57) ABSTRACT

An automatic backlight turns on before a user hits a key, but only in dark lighting conditions. A capacitive proximity sensor detects active handling of the device and the backlight itself is used as a light sensor. The circuit requires only a single additional capacitor and three free I/O pins to implement on typical microprocessor-based systems (such as remote controls). Because the system uses the current backlight LED as a sensor, devices can often be upgraded to include this feature without changing the existing packaging.

7 Claims, 5 Drawing Sheets

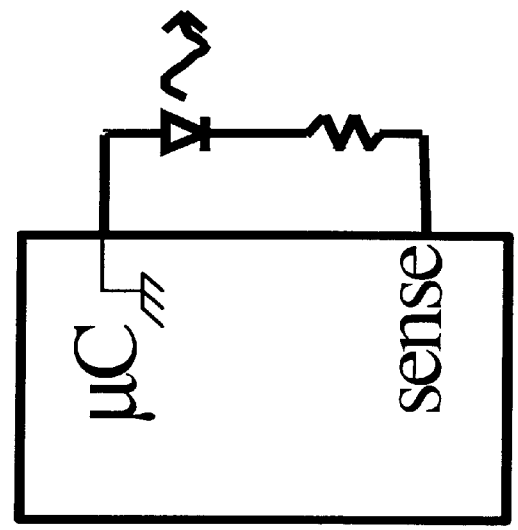
*Fig. 4c* "Discharge"
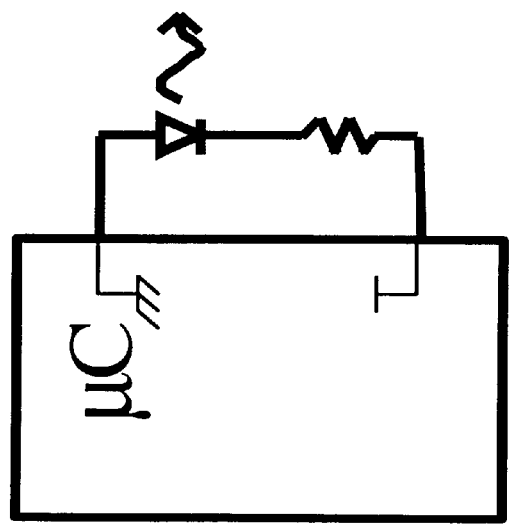
*Fig. 4b* "Reverse Bias"
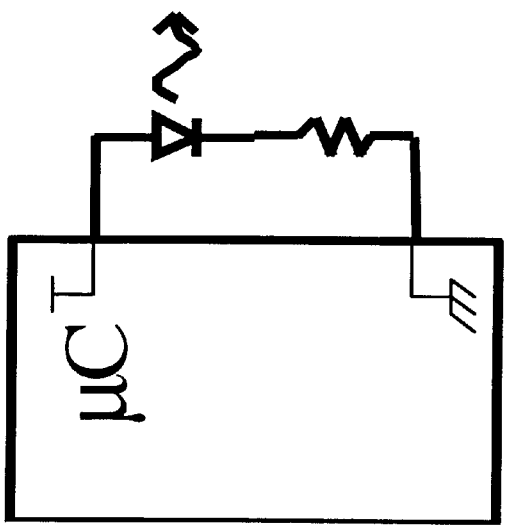
*Fig. 4a* "Light"

AUTOMATIC BACKLIGHT FOR HANDHELD DEVICES

FIELD OF THE INVENTION

This invention relates generally to light emitting diodes, and more particularly to using light emitting diodes as light sensors as well as light emitters.

BACKGROUND OF THE INVENTION

Remote controls, personal digital assistants (PDAs), pagers, cell phones and other handheld devices often include a backlight for display, keys, and control buttons so that the devices can be used in dark environments. Generally, the user must press a button, open a lid, or take some other sort of action to turn on the backlight. However, locating the backlight actuation mechanism can be difficult to do in the dark. Backlights are also extensively used in passive display panels that are subject to various levels of ambient light, for example, vehicle and plane instrument panels.

Some conventional mechanisms turn on the backlight by any user action. This provides multiple ways to activate the backlight, but the user must be careful not to hit an undesirable function key in the dark by mistake. Worse still, this mechanism turns on the backlight even in bright environments, when it is not needed. Because battery life is critical in handheld devices, some designers have added light sensors to prevent actuation in bright light conditions, but this adds complexity and cost.

Another prior art mechanism uses a combination of accelerometers, capacitive touch sensors, and infrared proximity sensors to determine a handling state of a mobile phone to turn on a backlight, see Hinckley et al., "Toward More Sensitive Mobile Phones," Proceedings of ACM UIST, 2001. Not only are these components expensive, they also draw a substantial amount of power and require significant tooling changes for the design of the device's enclosure. A simpler mechanism uses a simple capacitive proximity sensor as described in U.S. patent application Ser. No. 09/864,812, "Real-Time Buffering for Telephone Handsets," filed by Dietz et al. on May 24, 2001, but with a slight modification to detect motion rather than simply crossing a threshold.

SUMMARY OF THE INVENTION

Unlike conventional systems, the automatic backlight turns on before the user hits a key, but only in dark lighting conditions. It is inexpensive, and uses very little power. A capacitive proximity sensor detects active handling of the device, and the backlight itself is also used as a light sensor. The circuit requires only a single additional capacitor and three I/O pins of a typical microprocessor-based systems (such as remote controls). Because the system also uses the backlight LED as a sensor, devices can often be upgraded to include this feature without changing the existing packaging.

BRIEF DESCRIPTION OF THE DRAWINGS

FIGS. 4a–c shows the circuit of FIG. 3 operating in light, reverse bias, and discharge modes, respectively.

DETAILED DESCRIPTION OF THE PREFERRED EMBODIMENT

Capacitance Measuring Circuit

Figure 1:
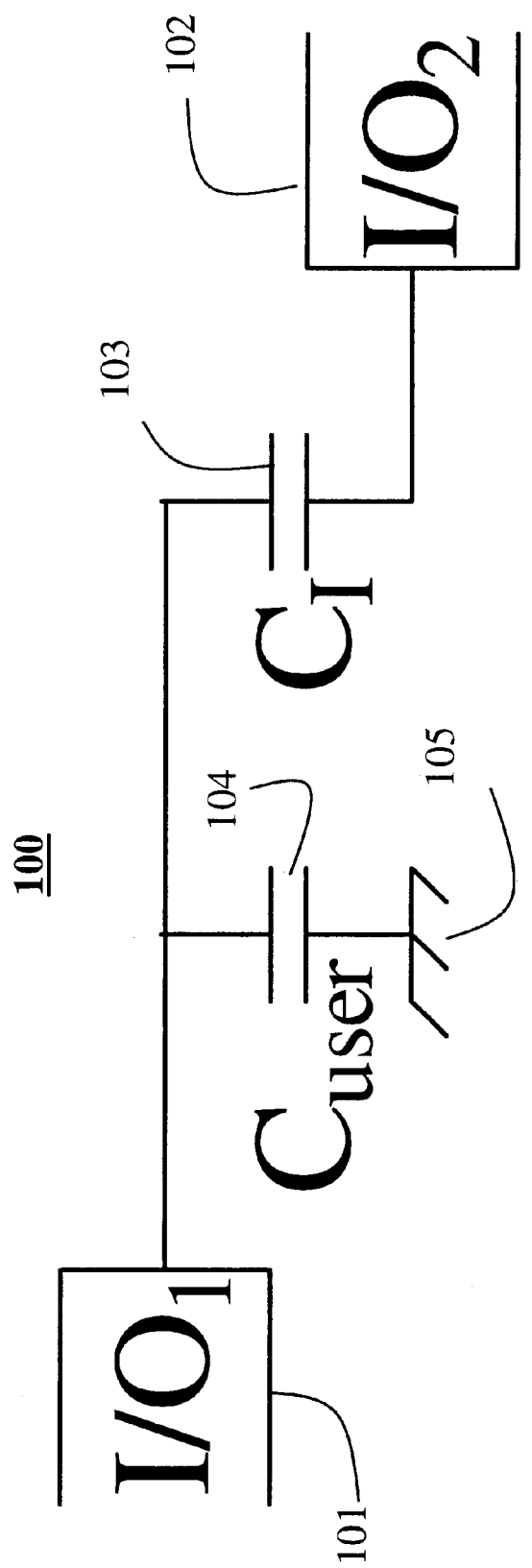
FIG. 1 is a schematic of a capacitance measuring circuit.

FIG. 1 shows a basic capacitance measurement circuit 100 used by the invention. The circuit uses two standard digital I/O pins 101–102 of a standard microprocessor, e.g., a PIC16C series microchip from Microchip Technology Inc., plus an integrating capacitor $C_I$ 103 to measure capacitive coupling $C_{user}$ 104 to a user 105 handling a device incorporating the circuit 100.

Measuring Process

To make the measurement, pins $I/O_1$ and $I/O_2$ 101–102 are initially set to output low, discharging the capacitors. Next, $C_I$ 103 is set to input, and $C_{user}$ 104 is set to output high. This charges $C_{user}$ to the supply voltage. Then, $I/O_1$ 101 is set to input and $I/O_2$ 102 is set to output low. This causes $C_I$ 101 and $C_{user}$ 104 to charge share. If $C_I > C_{user+}$, then this causes a small increase in the charge on $C_I$ 103. Repeating this cycle of charging $C_{user}$ and sharing with $C_I$ slowly charges up $C_I$ 101, in exponentially decreasing steps proportional to $C_{user}/C_I$. When $C_{user}$ is charging, $I/O_2$ is an input, and can be used to determine when a charge level on $C_I$ has caused the input to cross an input threshold T. By counting how many charge-share cycles are required to cross the input threshold T, a high-resolution measurement of the capacitive coupling $C_{user}$ is acquired.

Given this basic capacitance measurement circuit 100, it is now possible to detect capacitive change in a robust fashion, even with a small amount of noise, and slow component drift. After each measurement, the absolute difference from the previous measurement is low-pass filtered via a single pole filter, and the output of this filter is checked to see if it exceeds the threshold T.

By placing sensing electrodes on a printed circuit board to form a $C_{user}$ capacitance that varies with handling and using the above described circuit and process, a sensitive handling sensor is constructed. To save power, the microprocessor is left in sleep mode the majority of the time, waking up periodically to perform this quick measurement to determine handling state. For a typical remote control microprocessor, this operation draws microwatts of power, and thus is suitable for continuous handling sampling. This process is described in greater detail below with reference to FIG. 5.

Light Sensing

Another sensing technology for an automatic backlight for a device uses a light sensor. It is possible to use a cadmium sulfide (CdS) cell, or some other separate photo-detector. However, a separate detector typically requires a modification to the device's case, as well as a mechanism to channel light to the sensor in a way that is not obscured by ordinary handling.

Instead, it is possible to use the backlight LED itself as the light sensor. This requires only the use of an additional I/O pin on the microprocessor, but no other extra components. As an advantage, the backlight LED is already ideally optically coupled to an area of the device that is to be illuminated.

LEDs are photodiodes, and the ability of LEDs to be used as detectors is well known, see "Siliconnections: Coming of Age in the Electronic Era," Forrest Mimms, 1985. However, for unknown reasons, this ability to use an LED as a light detector has rarely been exploited in prior art devices. There, LEDs are almost universally used only as light emitters. Possibly the problem has been the lack of a simple circuit that can easily switch between emitting and detecting.

Figure 2:
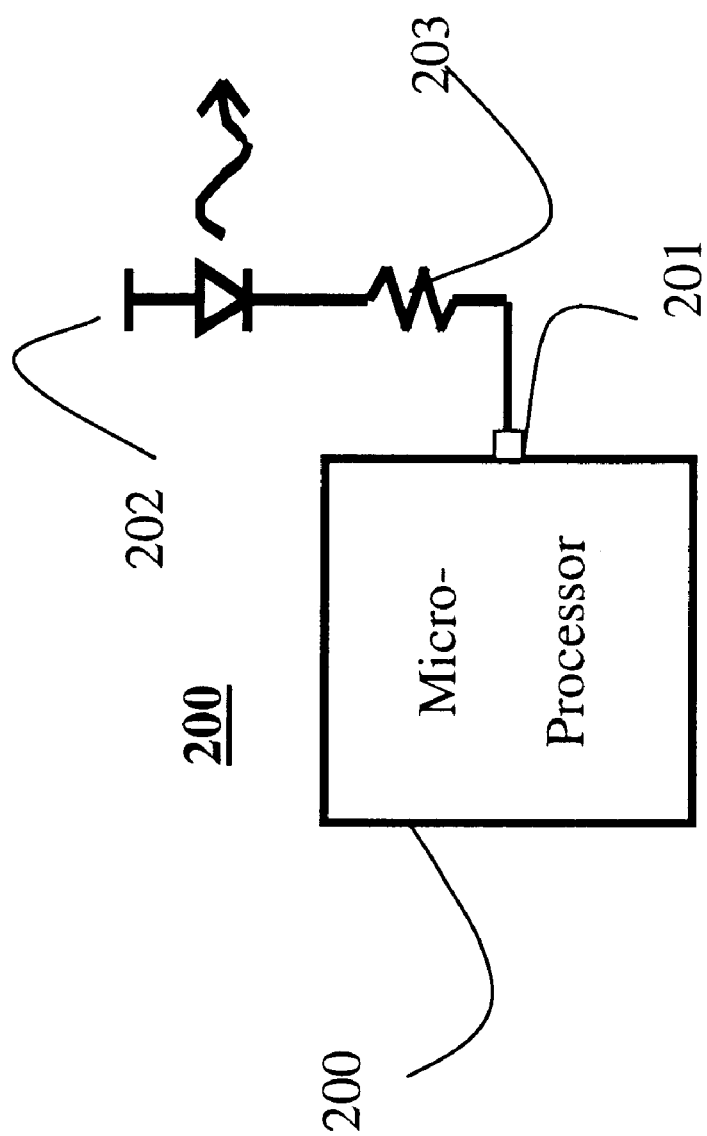
FIG. 2 is schematic of a prior art light emitter circuit.

FIG. 2 shows a typical prior art LED emitter circuit 200. An I/O pin 201 of a microprocessor controller 200 is used to sink current through an LED 202 with a resistor 203 to limit the current.

Figure 3:
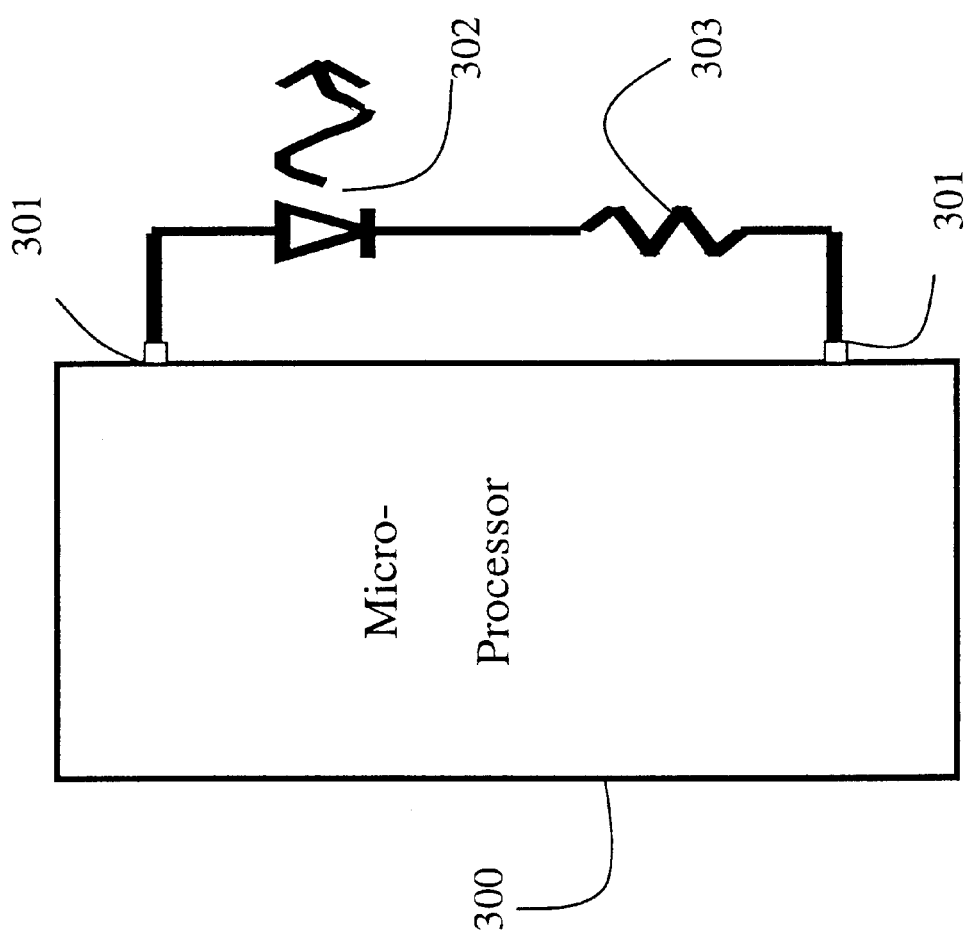
FIG. 3 is a schematic of an LED emitter/detector circuit according to the invention.

FIG. 3 shows an LED emitter/detector circuit according to the invention. Here, the Led 302 and resister 303 are coupled in series between two I/O pins 301 of the microprocessor 300. Now both ends of the LED/resistor circuit are driven by the microprocessor.

FIGS. 4a–c show how this circuit can operate in three modes, "light," "reverse bias," and "discharge," respectively. In the light mode, the LED operates conventionally and emits light. In reverse bias mode, the normal emitting polarities are switched to reverse bias the diode junction. By releasing one end in discharge mode, i.e., setting that end to be an input, an optically generated photocurrent can discharge the junction at a rate proportional to the amount of received light. The capacitive discharge can be measured as described above. At some point, the voltage on the input pin crosses an input threshold T. By timing how long this takes, a high-resolution measurement of the light level is made.

The circuit according to the invention requires no addition components, and draws extremely little power during sensing. By switching quickly between emitting and sensing modes, the LED can appear to be continuously emitting, even though it is briefly switching to sensing at periodic intervals.

Automatic Backlight

Figure 5:
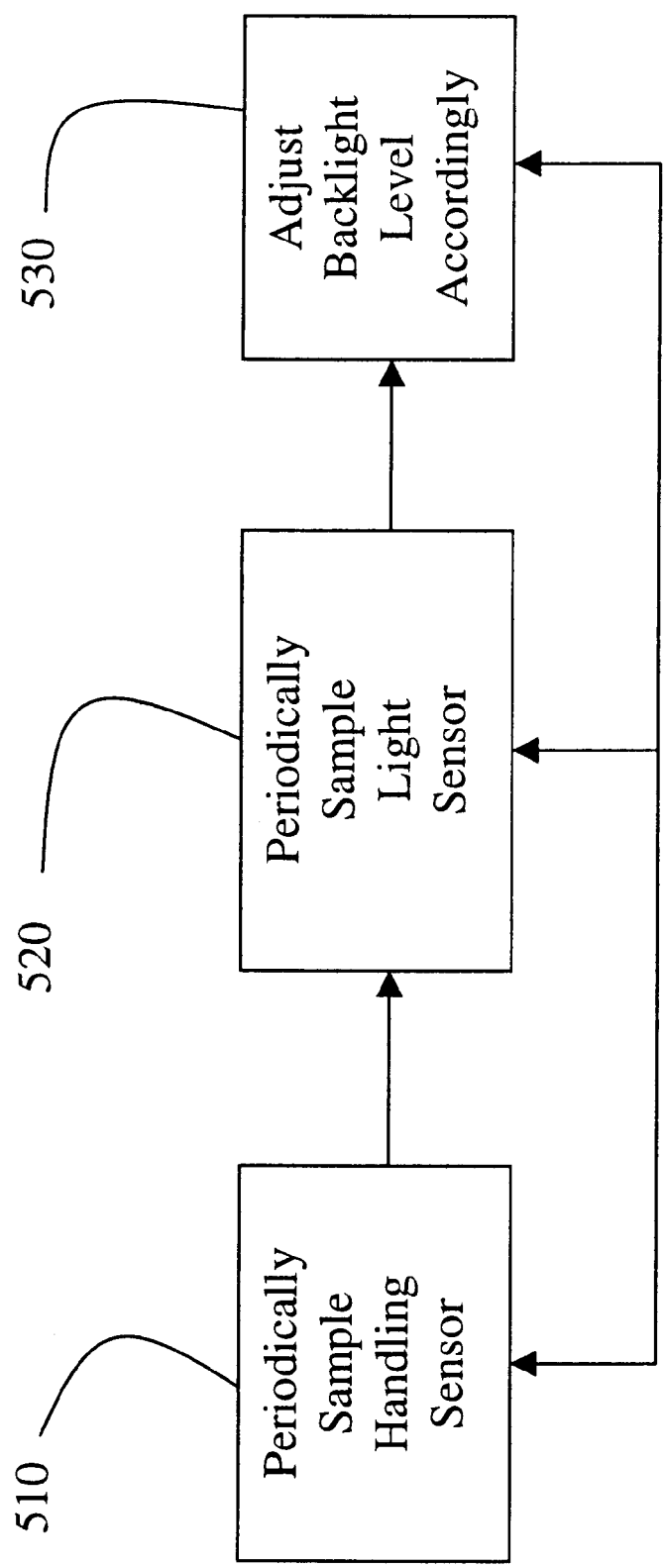
FIG. 5 is a flow diagram of a process operating an automatic backlight according to the invention.

As shown in FIG. 5, the light sensor circuit of FIG. 4 can be used alone or in combination with the handling sensor circuit of FIG. 1 to construct an automatic backlight for handheld devices.

The basic process repeatedly samples 510 the handling sensor. If handling is detected, then sample 520 the light sensor. If the sensed level of ambient light is less than a predetermined threshold, then adjust the backlight level accordingly. In a simple case, the light is either turned on or off. Alternatively, the level of backlight emitted is some function of the measured level of ambient light. If the device has not been handled for a predetermined time interval, then turn off the backlight and return to the normal sampling state.

This process has an interesting advantage. If the device is not being actively handled, then the capacitive coupling with the user does not change, and the backlight turns off automatically. This is useful in the case where the user is just holding the device, for example, the device is a remote control, and the user is watching TV holding the remote control in a steady state. As long as the user does not move his or her hand relative to the remote control, no "handling" is detected, and the backlight turns off. As soon as the user moves to use the remote control, the backlight turns on again only if the ambient light is less than the predetermined threshold.

Shipping

For shipping the device, it is possible that a situation can arise where the device is constantly being jostled relative to conductive packing materials. This could activate the backlight. Therefore, it is useful to specifically look for this case of extended "handling" and purposely raise the handling time interval threshold to preserve battery life.

Standby

It should be noted that the handling sensor and the light sensor can serve other purposes as well. In the case of a remote control, the handling sensor can be used to immediately transmit a "stand-by" signal to a controlled device to enable the controlled device to prepare for a request from the user. For example, projection TVs and some other type of appliances have fairly long warm-up times. Anticipating that a user is likely to turn on power can allow these appliances to preemptively begin the start-up process and thus decrease the apparent startup time from the users perspective.

The light sensor can also be used to measure the relative amount of ambient light, and automatically adjusting the brightness level of backlight to match the level of ambient light.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. An automatic backlight, comprising:

an LED coupled in series with a resistor;

a micro-processor having a first I/O pin connected to the LED and a second I/O pin coupled to the resistor;

means for periodically driving the LED in forward bias to emit light;

means for periodically driving the LED in reverse bias;

means for discharging the LED after driving the LED in reverse bias to measure a level of ambient light; and means for adjusting a level of the emitted light according to a level of measured ambient light.

2. The automatic backlight of claim 1 wherein the level of emitted light is on or off.

3. The automatic backlight of claim 1 further comprising:

means for measuring a capacitive coupling with a user, and only driving the LED when there is a capacitive coupling with the user.

4. The automatic backlight of claim 1 further comprising:

means for measuring a capacitive coupling with a user.

5. The automatic backlight of claim 4 wherein the LED is driven only when the capacitive coupling with the user exceeds a predetermined threshold.

6. The automatic backlight of claim 4 wherein a standby signal is transmitted to a controlled device when the capacitive coupling with the user exceeds a threshold.

7. A method for operating an automatic backlight, comprising:

coupling an LED in series with a resistor;

connecting a first I/O pin of a microprocessor to the LED and a second I/O pin to the resistor;

periodically driving the LED in forward bias to emit light;

periodically driving the LED in reverse bias;

discharging the LED after driving the LED in reverse bias to measure a level of ambient light; and adjusting a level of the emitted light according to a level of measured ambient light.

\* \* \* \* \*